United States Patent [19]

Londino, Jr.

[11] Patent Number: 4,878,296

[45] Date of Patent: Nov. 7, 1989

[54] APPARATUS AND METHOD FOR LOCATING THE AXIS OF SYMMETRY (CENTER OF CIRCULAR CROSS SECTION) OF THREE DIMENSIONAL OBJECTS

[75] Inventor: Joseph M. Londino, Jr., Mishawaka, Ind.

[73] Assignee: The United States of America as represented by the Secretary of the Navy, Washington, D.C.

[21] Appl. No.: 184,217

[22] Filed: Apr. 22, 1988

[51] Int. Cl.⁴ .................... G01C 29/00

[52] U.S. Cl. .................... 33/227; 33/286; 33/391; 343/894

[58] Field of Search .................... 33/227, 228, 263, 283, 33/286, 333, 347, 365, 370, 371, 391, 397, 520, 644, 645; 356/149, 153, 250; 343/894, 840

[56] References Cited

U.S. PATENT DOCUMENTS

| | | | |
|---|---|---|---|
| 174,892 | 3/1876 | Beckwith . | |
| 1,109,008 | 9/1914 | Norton . | |
| 2,517,295 | 8/1950 | Esher | 33/397 |
| 3,354,549 | 11/1967 | Fisher | 33/397 |
| 3,435,532 | 4/1969 | Brasier | 33/286 |
| 3,548,508 | 12/1970 | Jacobsen . | |
| 3,858,984 | 1/1975 | Denton et al. | 356/153 |
| 4,206,550 | 6/1980 | Boyett et al. | 33/227 |
| 4,590,481 | 5/1986 | Burditt | 343/894 |
| 4,608,573 | 8/1986 | Paullin | 343/894 |
| 4,679,937 | 7/1987 | Cain et al. | 356/138 |

*Primary Examiner*—William A. Cuchlinski, Jr.
*Assistant Examiner*—Patrick R. Scanlon
*Attorney, Agent, or Firm*—Thomas E. McDonnell; A. David Spevack; Edward F. Miles

[57] ABSTRACT

An apparatus and method for locating the vertical axis of symmetry of a surface of horizontal circular cross-section. The apparatus has a plumb structure that establishes a vertical line of sight, and a horizontal translating structure that preselectedly locates the plumb in the two horizontal dimensions. The plumb has at least three arms whose ends are constrained to lie on a circular perimeter which, because the arms are fixed to the plumb, is horizontally disposed. The translating structure and the arms are manipulated so that the end of the arms touch the surface, constraining the line of sight to be colinear with the axis of symmetry. A laser can make the axis visible. The apparatus and method are useable to locate the focal axis and focus of a parabolic antenna.

9 Claims, 4 Drawing Sheets

APPARATUS AND METHOD FOR LOCATING THE AXIS OF SYMMETRY (CENTER OF CIRCULAR CROSS SECTION) OF THREE DIMENSIONAL OBJECTS

BACKGROUND OF THE INVENTION

The invention pertains to geometrical instruments, more particularly those that locate the vertical center line of three dimensional objects having circular horizontal cross section, and most particularly those that locate the focal axis of parabolic antennas.

A general problem with widespread applicability to surveying instruments is the location of the normal axis of circular symmetry of an object having a horizontally disposed circular cross section. As with any geometrical instrument, precision on the one hand, and ruggedness for field use on the other, are critical determinants of the usefulness or uselessness of such instruments. This is especially true for the installation of parabolic antennas, which are objects of circular revolution about a central focal axis. The antenna's focus, located on the focal axis, is the point at which the antenna's feed or pickup must be disposed. As such an antenna is used with increasingly higher frequencies, smaller errors in placement of the feed or pickup can result in significant degradation of the antenna's performance. Moreover, small deformations in such an antenna's surface can have a significant effect on antenna performance especially at high frequencies, but the process of locating the antenna's focus and installation of the feed or pickup often requires the antenna's surface to support the significant weight of a centering instrument, a technician, or both, weight which can easily damage the antenna's surface.

SUMMARY OF THE INVENTION

Accordingly, an object of the invention is to permit precise location of the normal axis of circular symmetry of a three dimensional object having a horizontally disposed circular cross section.

Another object of the invention is to do this with equipment that is simple, inexpensive, reliable, and rugged.

Another object of the invention is to permit location of this axis without requiring the three dimensional object to support significant, or if desired any, weight.

Another object of the invention is to permit location of the focal axis of a parabolic antenna, and thus to aid in the locating of the parabolic focus itself.

Another object of the invention is to increase the precision with which this focal axis can be located so as to make such an antenna useful at higher frequencies.

In accordance with these and other objects made apparent hereinafter, the invention most broadly encompasses an apparatus and method for locating the vertical axis of symmetry of a surface having a horizontally disposed circular cross section, and features an attaching structure for mounting the apparatus, and a plumb structure for establishing a vertical line of sight. The attaching structure can be manipulated to displace the plumb structure along two orthogonal horizontal directions so as to locate the plumb structure and its vertical line of sight horizontally at will. The plumb structure is further adapted to contact the object's surface at three points on the perimeter of a horizontally disposed circle. The combination of the plumb action and the contacting structures constrain the vertical line of sight to be coincident with the surface's normal axis of symmetry, accuracy being limited only by the overall dimensions of the apparatus and the machined tolerances of its components. For a parabolic antenna, one can use the manufacturer's specifications to measure the focal distance along the focal axis established by the invention, or, alternatively, use interferometrics to locate the focus. The increased percision with which the apparatus locates the focal axis correspondingly increases the precision with which one can pinpoint the focus for placing the feed or pickup, thereby increasing the antenna's upper frequency range. Because the apparatus need not be supported by the surface, or alternatively can be supported only at one spot on the surface, the apparatus minimizes or eliminates risk of damage to the object during the apparatus's use.

In the preferred embodiment, the plumb structure can have a laser coincident with the vertical axis, so as to make the axis of symmetry both visible and more precisely defined. The contacting structures can be at least three equally long arms attached annularly symmetric about the plumb's vertical line of sight, and made extensible in manner similar to that of an umbrella, so that as the arms extend, their ends are colinear with the perimeter of horizontally disposed circles of ever increasing size. Manipulation of the apparatus, most especially extension of the arms, is done until the ends of the arms lightly touch the object's surface.

The objects, features, and advantages of the invention are more fully appreciated from the following detailed description of the preferred embodiment, it being understood, however, that the invention is capable of extended application beyond the precise details of the preferred embodiment. Changes and modifications can be made that do not affect the spirit of the invention, nor exceed its scope, as expresed in the appended claims. Accordingly, the invention is now described with particular reference to the accompanying drawings, wherein:

BRIEF DESCRIPTION OF THE DRAWINGS

FIGS. 5*a* and 6*b* are schematic views illustrating the operation of the embodiment of the invention.

DETAILED DESCRIPTION

Figure 2:
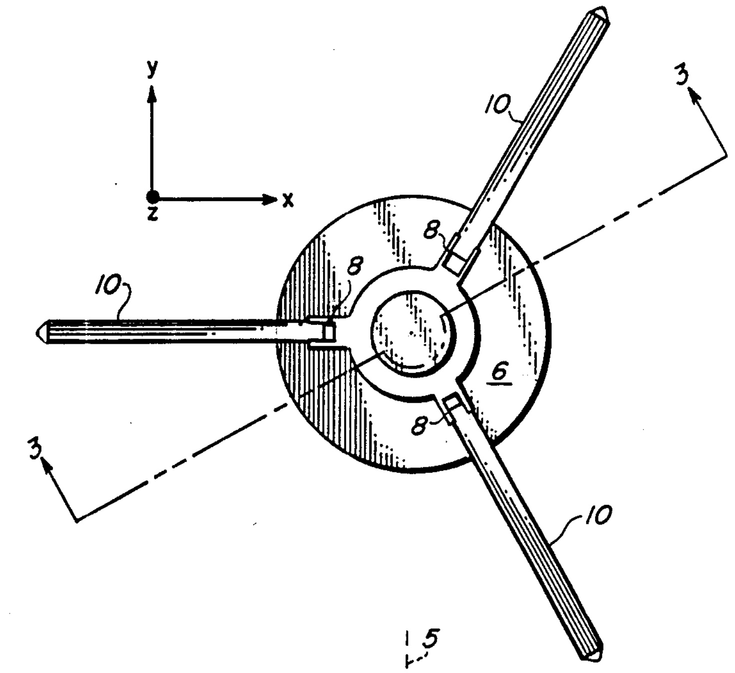
FIG. 2 is an isometric view of the embodiment viewed in the direction of lines 2—2 of FIG. 1.
Figure 1:
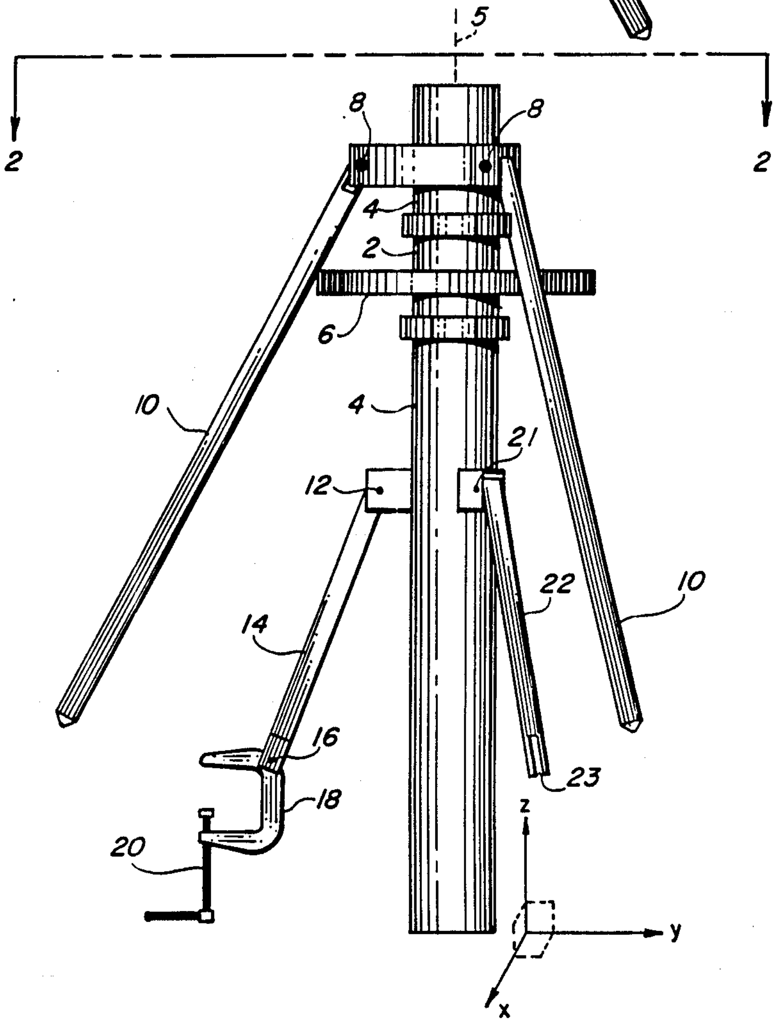
FIG. 1 is an isometric view of an embodiment of the invention.
Figure 3:
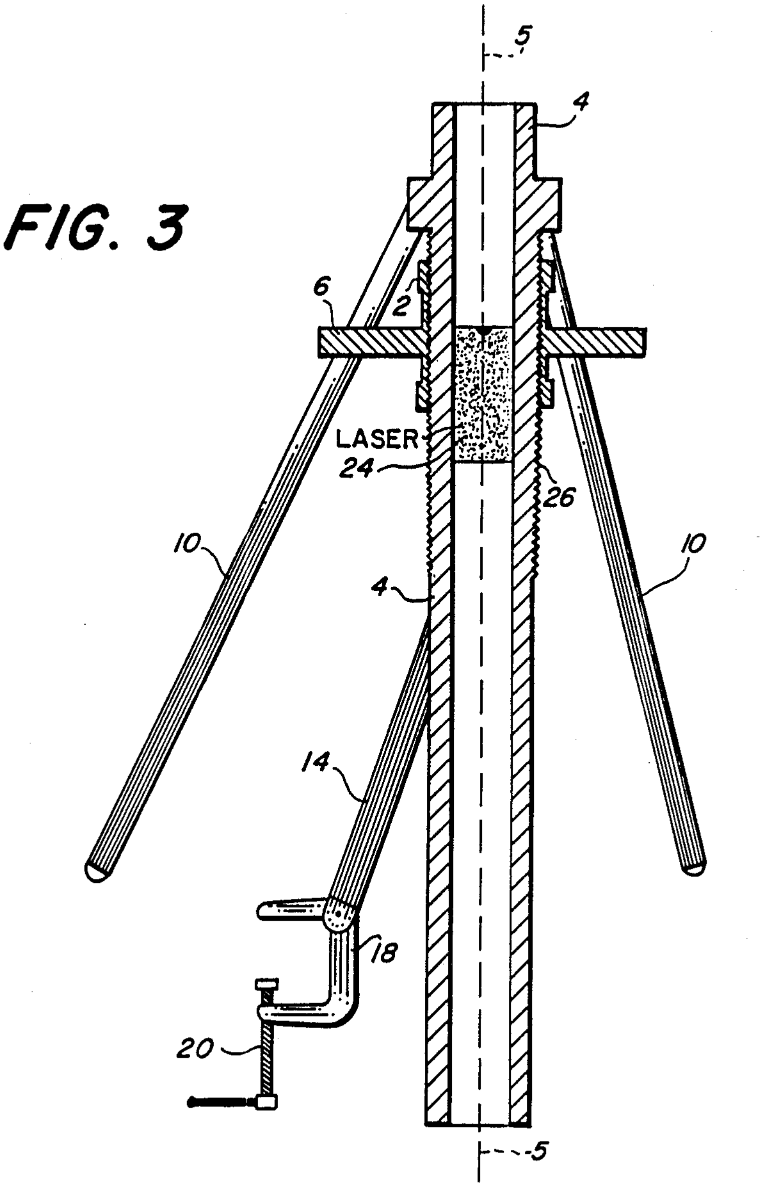
FIG. 3 is a section view in the direction of lines 3—3 of FIG. 2, the view being of a cut along the dotted lines of FIG. 2.

With reference to the drawing figures, and especially FIGS. 1-3, a particular embodiment of the invention is illustrated. The embodiment employs a cylindrical outer sleeve 2 concentrically mounted about cylindrical inner sleeve 4. Sleeves 2 and 4 are disposed annularly symmetric about axial center line 5, and are threaded together by screw threads 26 so that relative rotation of inner and outer sleeves 2 and 4 with respect to one another causes axial displacement of one with respect to the other along center line 5. Outer sleeve 2 has a flange portion 6 which extends radially outward to abut three arms 10. Arms 10 are of equal length, and attached to inner sleeve 4 by brackets and pins 8, the latter allowing arms 10 to rotate freely about pins 8. A lever 14 is pinned at its opposite ends to inner sleeve 4 at bracket and pin 12, and to a clamp 18 at pin 16. Clamp 18 has tightening bolt 20 for attaching clamp 18, and hence mounting the entire apparatus, on any convenient surface, as discussed more fully below. An auxilliary lever 22 is similarly pinned for rotation to inner sleeve 2 by bracket and pin 21. Auxillary lever 22 has a slot 23 for mountingly locating over planar edges. Inner and outter sleeves 2 and 4 and arms 10 together constitute a unit for rotation about pin 12, and these members are chosen and arranged so that their total center of mass lies below pin 12 along central axis 5, freeing these members for rotating about pin 12 under gravity, in effect acting as a plumb. This plumb action aligns axis 5 with the vertical, as amplified by illustrative orthogonal reference axes, x, y, and z. The plane formed by axes x and y is horizontally disposed, and axis z is vertically disposed. Upon relative rotation of sleeve 2 and 4 so as to cause outer sleeve 2 to move upwards with respect to inner sleeve 4, flange 6 cams each arm 10 outwardly, causing arms 10 to rotate about their pins 8 and extend radially outward, much like the opening of an unbrella.

Figure 4A:
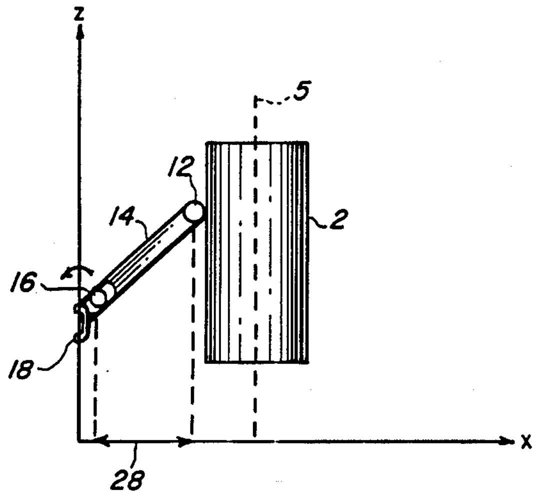
FIGS. 4*a* and 4*b* are schematic views illustrating how one can manipulate the embodiment of the invention to selectively orient it horizontally.
Figure 4B:
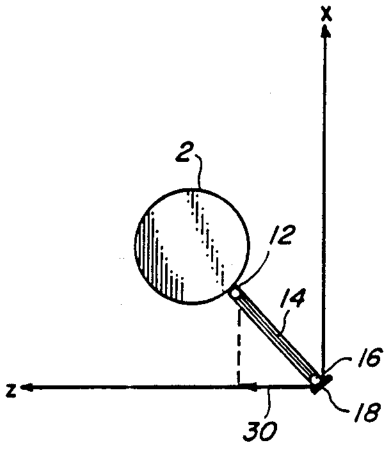
Figure 5A:
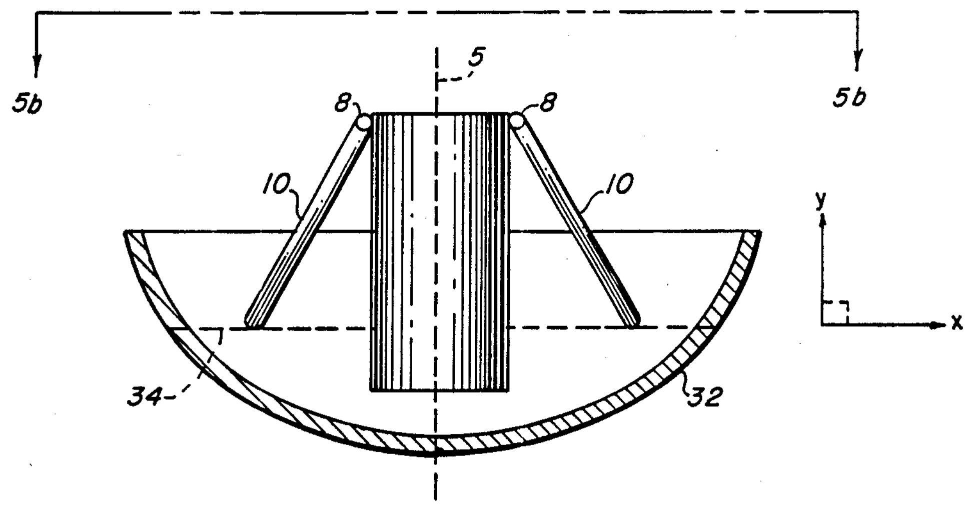
Figure 5B:
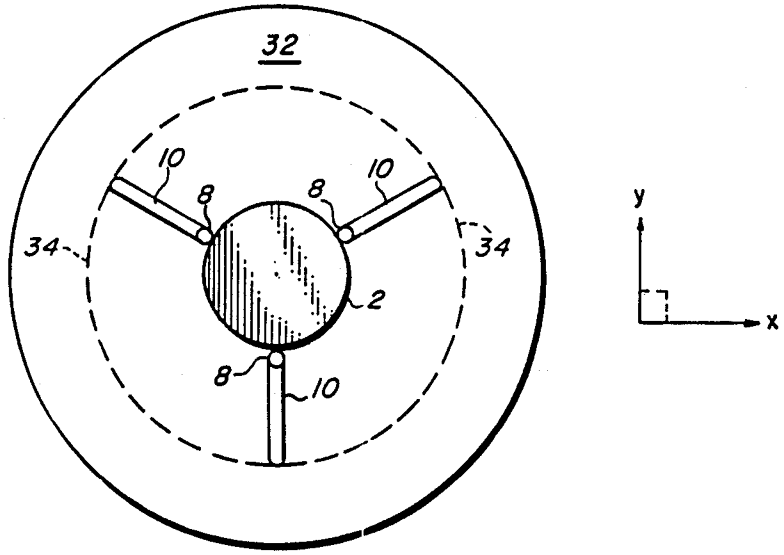

With especial reference to FIGS. **4*a* and 4*b*, one can see how the embodiment illustrated in FIGS. 1–3 can be positioned horizontally. The plumb structure is represented schematically by inner sleeve 2. Clamp 18 is used to fix the apparatus to any convenient surface. The pinning of lever 14 at pins 12, 16, allows one to extend inner sleeve 4 in a manner similar to that of a reciprocating piston, this movement having a projection 28 on the x axis. Similarly, tightening or loosening of clamp 18 enables one to rotate inner sleeve 4 so as to selectively preposition sleeve 2 in the horizontal x, y axis. (FIG. 4*b* illustrates such a rotation of sleeve 4 from an initial position colinear with the x axis to an angular position intermediate the x and y axis, this angular rotation having linear projection 30 on the y axis.) As is seen from FIGS. 4*a* and 4*b*, by manipulating clamp 18 and lever 14 one can preposition the apparatus, and, more importently, the apparatus's centerline 5**, to any preselected vertical axis in the x, y (horizontal) plane.

The operation of the apparatus is best understood by reference to FIGS. **5*a* and 5*b*. For simplicity, only the plumb portion of the apparatus is illustrated, and is indicated schematically by outer sleeve 2 and arms 10. The apparatus is shown in use with a surface 32 which has a circular horizontal cross section (i.e., is circularly symmetric about the z axis). The perimeter of one such horizontal circular cross-section is indicated by numeral 34. Clamp 18 (FIGS. 1–4) mounts the apparatus on surface 32, or on any convenient adjacent surface, after which the apparatus is manipulated as discussed with respect to FIGS. 4*a* and 4*b* to bring center line 5 in approximate coincidence with the vertical axis of circular symmetry of surface 32. Auxiliary lever 22 can aid this manipulation. Outer sleeve 2 and flange 6 (FIGS. 1–3) are caused to rotate so as to cam arms 10 outwardly. Each arm 10 rotates about its respective pin 8 in a vertical plane (the intersection of these planes being coliner with line of sight 5). Because arms 10 are of equal length and symmetrically disposed about axis 5, arms 10 will touch surface 32 simultaneously if axial center line 5 coincides identically with the axis of symmetry of surface 32. Lever 14 and clamp 18 can be manipulated as discussed with respect to FIGS. 4*a* and 4*b* to finely position the apparatus until arms 10 simultaneously touch surface 32 at circular perimeter 34. Then laser 24 can be turned on to make visible this center line. If surface 32 represents the surface of a parabolic antenna, one could use manufacturer's specifications to measure the focal distance along this illuminated axis so as to place the antenna's feed or pickup. Alternatively, one could use interferometrics to locate the focus. Once center line 5 is aligned with the axis of symmetry, slot 23 of auxiliary lever 22** can be located over any convenient planar surface to fix the apparatus in place.

The invention has been shown in what is considered to be the most practical and preferred embodiment. It is recognized, however, that obvious modifications may occur to those with skill in this art. Accordingly, the scope of the invention is to be discerned solely by reference to the appended claims, wherein:

What is claimed and desired to be secured by letters patent of the United States is:

1. An apparatus for locating the vertical axis of symmetry of a surface having a horizontally disposed circular cross section, said axis of symmetry extending through the center of said circular cross section and being perpendicular to said circular cross section, said apparatus comprising:

plumb means for establishing a vertical line of sight, said plumb means comprising means for contacting said surface at at least three points, all of said points being located on the circular perimeter of said circular cross section; and attaching means for mounting said apparatus, said attaching means comprising:

a first translational means for displacing said plumb means a first preselected distance, said first preselected distance having a linear projection extending along a first horizontal direction; and a second translational means for displacing said plumb means a second preselected distance, said second preselected distance having a linear projection extending along a second horizontal direction;

each of said projections being orthogonal to one another;

and wherein said first and second translational means and said means for contacting are each adapted to cooperate with one another to permit said line of sight to be located collinear with said vertical axis of symmetry;

wherein said means for contacting comprises:

at least three extensible arms; and a camming means for deflecting said at least three extensible arms outward from said camming means; wherein said deflecting is effective to cause said at least three extensible arms to extend outward from said camming means effective to contact said perimeter at said at least three points.

2. The apparatus of claim 1 wherein said camming means comprises an inner cylindrical sleeve and an outer cylindrical sleeve, said outer cylindrical sleeve being disposed concentrically about said inner cylindrical sleeve, each said cylindrical sleeve being disposed radially symmetric about said vertical line of sight, said inner and said outer cylindrical sleeve being adapted to permit axial translation with respect to one another, said inner and said outer cylindrical sleeves being further adapted to cooperate to cause said deflecting responsive to said axial translation.

3. The apparatus of claim 2, wherein each of said at least three extensible arms is attached by a respective hinge to said inner cylindrical sleeve for rotation in a corresponding vertically disposed plane, each of said corresponding vertically disposed planes being collinear with said vertical line of sight.

4. The apparatus of claim 3 wherein said plumb means comprises a laser means for making said vertical line of sight visible.

5. The apparatus of claim 4, wherein said surface is a parabolic antenna and said vertical axis of symmetry is the said vertical axis of symmetry;

and wherein said first translational means comprises first means for rotationally displacing said plumb means about a vertically disposed axis, said vertically disposed axis being distinct from said axis of symmetry and said line of sight, said rotating of said plumb means about said vertically disposed axis being effective to cause displacing of said plumb means said first preselected distance said second translational means comprises second means for rotationally displacing said plumb means about a horizontally disposed axis, said rotating of said plumb means about said horizontally disposed axis being effective to cause said displacing of said plumb means said second preselected distance.

6. An apparatus for locating the vertical axis of symmetry of a surface having a horizontally disposed circular cross section, said axis of symmetry extending through the center of said circular cross section and being perpendicular to said circular cross section, said apparatus comprising:

plumb means for establishing a vertical line of sight, aid plumb means comprising means for contacting said surface at at least three points, all of said points being located on the circular perimeter of said circular cross section; and attaching means for mounting said apparatus, said attaching means comprising:

a first translational means for displacing said plumb means a first preselected distance, said first preselected distance having a linear projection extending along a first horizontal direction, and a second translational means for displacing said plumb means a second preselected distance, said second preselected distance having a linear projection extending along a second horizontal direction;

each of said projections being orthogonal to one another;

and wherein said first and said second translational means and said means for contacting are each adapted to cooperate with one another to permit said line of sight to be located collinear with

7. The apparatus of claim 6, wherein said first translational means is a clamp, and said second translational means comprises:

a first hinge and a second hinge, said first hinge being fixed to said plumb means effective to permit said plumb means to establish said vertical line of sight, said second hinge being fixed to said clamp; and a lever, said lever being pinned to said first and said second hinges effective to permit said second translational means to rotate in a vertically disposed plane.

8. The apparatus of claim 7, wherein:

said means for contacting comprises at least three extensible arms and a camming means for deflecting said at least three extensible arms outward from said camming means, said deflecting being effective to cause said at least three extensible arms to extend outwardly from said camming means effective to contact said perimeter at said at least three points;

said means for camming comprises an inner cylindrical sleeve and an outer cylindrical sleeve, said outer cylindrical sleeve being disposed concentrically about said inner cylindrical sleeve, each said cylindrical sleeve being disposed radially symmetric about said vertical line of sight, said inner and said outer cylindrical sleeves being adapted to permit axial translation with respect to one another;

said inner and said outer cylindrical sleeves being adapted to cause said deflecting responsive to said axial translation;

wherein each of said at least three extensible arms is attached by a respective hinge to said inner cylindrical sleeve for rotation in a corresponding vertically disposed plane, each said corresponding vertically disposed plane being collinear with said vertical line of sight, said deflecting of said at least three extensible arms constituting rotation of each of said at least three extensible arms in said corresponding vertically disposed planes;

and wherein said plumb means comprises a laser means for making said vertical line of sight visible. focal axis of said parabolic antenna.

9. The apparatus of claim 8 wherein said surface is a parabolic antenna, and said vertical axis of symmetry is the focal axis said parabolic antenna.

* * * * *